3,031,494
STEROIDS
Frank L. Weisenborn, Middlebush, and Allen I. Laskin, Franklin Township, N.J., assignors to Olin Mathieson Chemical Corporation, New York, N.Y., a corporation of Virginia
No Drawing. Filed June 30, 1959, Ser. No. 823,855
3 Claims. (Cl. 260—488)

This invention relates to, and has for its object, the provision of new and useful compounds.

In accordance with this invention there is provided a class of compounds termed A-nor-11-desoxycorticosterone and 21-esters thereof, having the Formula I:

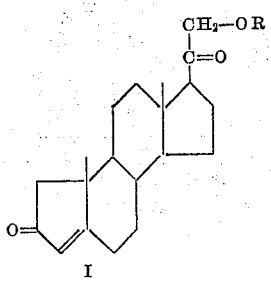

I wherein R is either hydrogen or the acyl radical of a hydrocarbon carboxylic acid of less than 10 carbon atoms such as a lower alkanoyl radical (e.g. acetyl), a monocyclicaryl lower alkanoyl radical (e.g. phenacetyl), or a monocyclicaroyl radical (e.g. benzoyl).

The compounds of Formula I may be prepared by any of several reaction schemes. Particularly suitable are methods comprising the 21-hydroxylation of A-norprogesterone to yield A-nor-desoxycorticosterone, a compound of this invention, which may be further treated by known esterification procedures to yield the 21-esters of A-nordesoxycorticosterone, also included within the scope of this invention. The preparation of the A-norprogesterone starting material is described by Weisenborn et al. in J. A. C. S., vol 81, page 1960 (1959).

The step of hydroxylating A-norprogesterone in the 21-position is preferably accomplished by fermentation procedures using microorganisms known to selectively hydroxylate steroids in the 21-position. Among the useful microorganisms there may be named *Wojnowicia graminis* (NRRL No. 2472), *Ophiobolus herpotrichus* (obtainable from Centralbureau voor Schimmelcultures, Baarn, Holland [no culture number]) and *Aspergillus niger* (American Type Culture Collection No. 9142). Fermentation is effected in a conventional manner using the well-known nutrient media capable of supplying carbon, nitrogen and energy to the developing culture. The temperature during fermentation is not critical within normal limits, but is preferably maintained at about 22 to 30° C. The A-norprogesterone is added to a living culture of the microorganism which has been incubating for about 24 hours. It may be added as such, or in the form of a solution in a solvent such as N,N-dimethylformamide. After the addition, the culture is further incubated for a period of up to a week, but in most cases a period of 72 hours is sufficient to yield the final product which may be isolated by conventional extraction procedures.

The isolated A-nor-11-desoxycorticosterone may be used as such, or may be esterified in the 21-position by treatment with agents capable of forming esters, such as the acyl halides (e.g. acyl chlorides) or acid anhydrides of hydrocarbon carboxylic acids having less than 10 carbon atoms in the acid moiety, as exemplified by lower alkanoic acids (e.g., acetic, propionic, butyric and enanthic), monocyclic hydrocarbon aromatic carboxylic acids (e.g., benzoic), monocyclic hydrocarbon aralkanoic acids (e.g., phenacetic), lower alkenoic acids, cycloalkane carboxylic acids, and cycloalkene carboxylic acids. The reaction conditions for esterification are not critical. If it is desired to hasten the formation of the desired esters, the reaction may be conducted at elevated temperatures in the range of 50 to 130° C. It is advantageous for the preparation of a pure product that the esterification reaction be conducted in the presence of an organic base (e.g. pyridine, collidine, etc.) and a solvent (e.g., pyridine, benzene, toluene, etc.).

The compounds of this invention, as embodied in Formula I are useful pharmaceuticals and intermediates in the preparation of other highly useful compounds. Thus, it has been found that A-nor-11-desoxycorticosterone and its 21-esters, as above outlined, exhibit salt retaining (mineralo corticoid) activity, and may therefore be used in the treatment of diseases characterized by adrenocortical insufficiency, such as Addison's disease, for which purpose they may be administered perorally as (tablets or capsules) in the necessary dosage as determined by the individual requirements.

The following examples are presented for the purpose of illustrating the present invention.

EXAMPLE I

*A-Nor-11-Desoxycorticosterone*

A. FERMENTATION

Surface growth of each of 5 two week old agar slant cultures of *Aspergillus niger* (American Type Culture Collection No. 9142), the slants containing as a nutrient medium (A):

|  | G. |
|---|---|
| Glucose | 10 |
| Yeast extract | 2.5 |
| $K_2HPO_4$ | 1 |
| Agar | 20 |
| Distilled water to 1 liter | | is suspended in 2.5 ml. of an 0.01% Duponol aqueous solution. One ml. portions of the suspension are used to inoculate ten 250 ml. conical flasks, each containing 50 ml. of the following sterilized medium (B):

|  | G. |
|---|---|
| Dextrose | 10 |
| Corn steep liquor | 6 |
| $NH_4H_2PO_4$ | 3 |
| Yeast extract | 2.5 |
| $CaCO_3$ | 2.5 |
| Soybean oil | 2.2 |
| Distilled water to 1 liter | |

After 24 hours' incubation at 25° C. with continuous rotary agitation (280 cycles per minute; 2 inch radius), 10% (vol./vol.) transfers are made to sixty-seven 250 ml. conical flasks each containing 50 ml. of fresh sterilized medium B plus 300 micrograms/ml. of A-norprogesterone. (The steroid is added by supplementing each flask with 0.25 ml. of a sterile solution of the steroid in N,N-dimethylformamide containing 60 mg./ml. of steroid.) After 72 hours of further incubating, the contents of the flasks are pooled and filtered through a Seitz clarifying pad. The flasks, mycelium and pads are washed with successive 50 ml. portions of warm water. The combined filtrate and washings have a volume of 2925 ml.

B. ISOLATION AND CHARACTERIZATION

The combined filtrate and washings (2925 ml.) are extracted three times with 1 l. portions of chloroform. The combined chloroform extracts are washed with water, dried over sodium sulfate and evaporated to dryness under vacuum leaving 662 mg. of crude oily material.

An additional 487 mg. of crude product is obtained by extracting the mycelium cake with 1 l. of CHCl$_3$. The combined product (1.149 g.) is dissolved in benzene and chromatographed on acid-washed alumina. Elution of the column with increasing amounts of chloroform in benzene gives 260 mg. of A-nor-11-desoxycorticosterone which crystallizes from acetone-hexane in colorless plates having the following properties: melting point about 148–149°; $[\alpha]_D +76°$ (chloroform);

$\lambda_{max.}^{EtOH}$ 234 m$\mu$ (log $\epsilon = 4.21$); $\lambda_{max.}^{Nujol}$ 2.94 m$\mu$, 5.86 m$\mu$, 5.98 m$\mu$, 6.19 m$\mu$.

Calcd. for $C_{20}H_{28}O_3$: C, 75.91; H, 8.92. Found: C, 76.22; H, 8.99.

EXAMPLE II

*21-Acetyl-A-Nor-11-Desoxycorticosterone*

A-nor-11-desoxycorticosterone (100 mgs.) is dissolved in 3 ml. of pyridine and 1 ml. of acetic anhydride and the solution allowed to stand overnight. The solvents are removed under vacuum, and the residue taken up in chloroform. The chloroform extracts are washed with 0.5 N hydrochloric acid, 5% sodium bicarbonate solution, dried over sodium sulfate and evaporated to dryness. The residue is purified by crystallization from ethyl acetate-hexane to yield 21-acetyl-A-nor-11-desoxycorticosterone.

This invention may be variously embodied within the scope of the appended claims.

What is claimed is:

1. A compound of the formula:

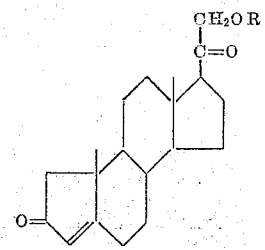

wherein R is a member selected from the group consisting of hydrogen and the acyl radical of a hydrocarbon carboxylic acid having less than ten carbon atoms.

2. The compound of claim 1 wherein R is hydrogen.
3. The compound of claim 1 wherein R is acetyl.

References Cited in the file of this patent

UNITED STATES PATENTS

| | | |
|---|---|---|
| 2,228,577 | Marker | Jan. 14, 1941 |
| 2,351,637 | Ruzicka et al. | June 20, 1944 |
| 2,805,978 | Hagemann et al. | Sept. 10, 1957 |
| 2,819,201 | Dulaney et al. | Jan. 7, 1958 |